United States Patent [19]

Cunningham

[11] Patent Number: 4,551,727

[45] Date of Patent: Nov. 5, 1985

[54] RADIO DIRECTION FINDING SYSTEM

[76] Inventor: David C. Cunningham, 5540 E. Charter Oak, Scottsdale, Ariz. 85254

[21] Appl. No.: 452,712

[22] Filed: Dec. 23, 1982

Related U.S. Application Data

[63] Continuation-in-part of Ser. No. 157,366, Jun. 9, 1980.

[51] Int. Cl.[4] ................................. G01S 3/54
[52] U.S. Cl. ................................. 343/418; 343/368
[58] Field of Search ............... 343/418, 428, 436, 368

[56] References Cited

U.S. PATENT DOCUMENTS

| | | | |
|---|---|---|---|
| 2,414,798 | 1/1947 | Budenbom | 343/428 |
| 2,481,509 | 9/1949 | Hansel | 343/428 |
| 3,157,878 | 11/1964 | Hansel et al. | 343/403 X |
| 4,041,496 | 8/1977 | Norris | 343/418 |

Primary Examiner—Theodore M. Blum
Assistant Examiner—Gilberto Barrón, Jr.
Attorney, Agent, or Firm—Edward W. Hughes

[57] ABSTRACT

A radio direction finding system based on the doppler frequency shift principle is disclosed which utilizes a polygonal shaped antenna array and a conventional FM receiver. Voltages from each antenna are combined in an rf summing circuit which may be located remotely from the antenna. Audio output from the FM receiver is processed to measure the phase angle of the commutation frequency phase modulation imparted to the rf receiver input signal by gain variations within the rf summer circuit. Bearing angle proportional to the measured phase angle is displayed in a circular array of light emitting diodes and a three digit decimal display and is provided for recording or remote display through a serial interface.

15 Claims, 8 Drawing Figures

RADIO DIRECTION FINDING SYSTEM

CROSS REFERENCE TO RELATED APPLICATIONS

This application is a Continuation-in-Part of copending prior application Ser. No. 06/157,366, filed on June 9, 1980, for a RADIO DIRECTION FINDING SYSTEM, by the same inventor.

FIELD OF THE INVENTION

This invention relates to radio direction finding systems and specifically to radio direction finding systems based on the doppler frequency shift principle whereby phase modulation is imparted to the received signal by electronically moving the effective receiving antenna location along a circular path such that the modulation phase angle indicates the bearing of the radio transmission.

DISCUSSION OF THE PRIOR ART

Radio direction finding (RDF) systems based on the doppler shift principle have been used for some time in aeronautical applications. Most non-doppler RDFs employ directional antennas which produce peaks or nulls in the signal amplitude as they are rotated. Doppler type systems, on the other hand, detect the phase modulation imparted to the signal by translation motion of the receiving antenna. As a consequence of the "capture effect" of the FM receiver which detects the phase modulation, doppler type systems generally are less sensitive to site errors than amplitude measurement systems. Early disclosures of RDFs based on detecting the doppler shift are given in U.S. Pat. No. 2,414,798, by H. T. Budenbom, U.S. Pat. No. 2,481,509, by P. G. Hansel and "Radio Direction-Finding by the Cyclical Differential Measurement of Phase", by C. W. Earp and R. M. Godfrey, J.IEE, 1947, 94, Pt. IIIA, pp. 705-721.

Practical doppler RDF systems do not mechanically rotate an antenna but instead rely on sequential switching between a series of antennas placed in a circular array. Since current flow in the non-selected antennas interacts with the signal induced in the selected antenna, methods have been invented for de-resonating the non-selected elements in such antenna arrays (U.S. Pat. No. 3,157,878 by P. G. Hansel, et. al.).

While providing generally better performance than amplitude detection systems, doppler type RDFs tend to be large and complex owing to the number of antennas needed to generate a suitably large phase modulation while at the same time keeping the incremental phase angle change occurring at the switchover between antennas small enough so as to reasonably approximate a continuously rotating single antenna element. Reducing the size of the antenna array decreases the magnitude of the phase modulation, and decreasing the number of elements in an array of given size causes larger increments of phase to occur as adjacent elements are selected. Both of these factors decrease system accuracy. Also, discretely commutated doppler RDFs generate rf transients at the receiver input which tend to momentarily overload the receiver causing desensitization, and the incremental phase modulation can result in false bearings being introduced from the modulation of off channel signals on to the selected frequency.

A recent disclosure (U.S. Pat. No. 4,041,496) by P. R. Norris attempts to overcome these problems by connecting the outputs of four antennas through electronically variable series resistive elements into a common antenna output to the receiver. The antenna dimensions and series resistances are chosen in such a manner that a constant antenna output impedance is presented to the receiver, and the resulting rf output is phase modulated in a manner which approximates that which would be introduced by a single rotating element. The magnitude of this phase modulation, however, is rather small, thus making the system difficult to use with an unmodified conventional FM receiver. Also, the variable series resistance circuitry must be made integral with the antenna itself because the technique depends on simultaneously controlling the rf currents through each antenna element in a prescribed manner to produce the proper output. A further disadvantage is that the array size is constrained to a specific small diameter as a consequence of the requirement for zero reactive mutual impedance between diagonally opposite elements.

OBJECTS

Accordingly, it is an object of this invention to provide a radio direction finding system utilizing the doppler principle compatible with a standard FM receiver.

It is another object of this invention to provide a doppler direction finding system having all of its electronics contained within a single enclosure located remotely from the antenna.

It is still another object of this invention to provide a doppler direction finding system capable of operating with a simple antenna array, the dimensions of which are not critical and may be varied over a wide range.

These and other objects of the invention are achieved through the use of electronically controlled variable transconductance devices which provide rf output currents proportional to their respective rf input voltages. The proportionality is determined by periodic low frequency control voltages generated within the control electronics. The rf output currents flow through a common load impedance which acts as a voltage summer. By properly selecting the control voltage waveforms, the rf output voltage is caused to be phase modulated at the periodic frequency of the control waveforms and to approximate that which would be induced in a single antenna rotating in the circular path which inscribes the polygonal figure formed by the elements of the antenna. Peak phase modulation is typically six times greater than that produced using the variable series resistance approach with the same size antenna. A conventional FM receiver is capable of detecting this phase modulation.

The input impedance of the rf summer containing the variable transconductance devices is a constant which may be matched to the characteristic impedance of the transmission line connecting each input to its corresponding antenna element and, consequently, the antenna array may be located at any convenient distance from the rf summer. Phase modulation is produced by linearly summing the rf voltages induced in the spatially separated antenna elements and is not dependent on the antenna self and mutual impedances. Therefore, antenna dimensions may be selected over a relatively wide range.

Additional signal processing of the receiver's audio output is provided to extract the commutation frequency component, measure its phase angle with respect to that of one of the rf summer control voltages, scale the resulting phase angle into a bearing angle and display it in one or more convenient formats.

DRAWINGS

DETAILED DESCRIPTION OF THE INVENTION

Figure 1:
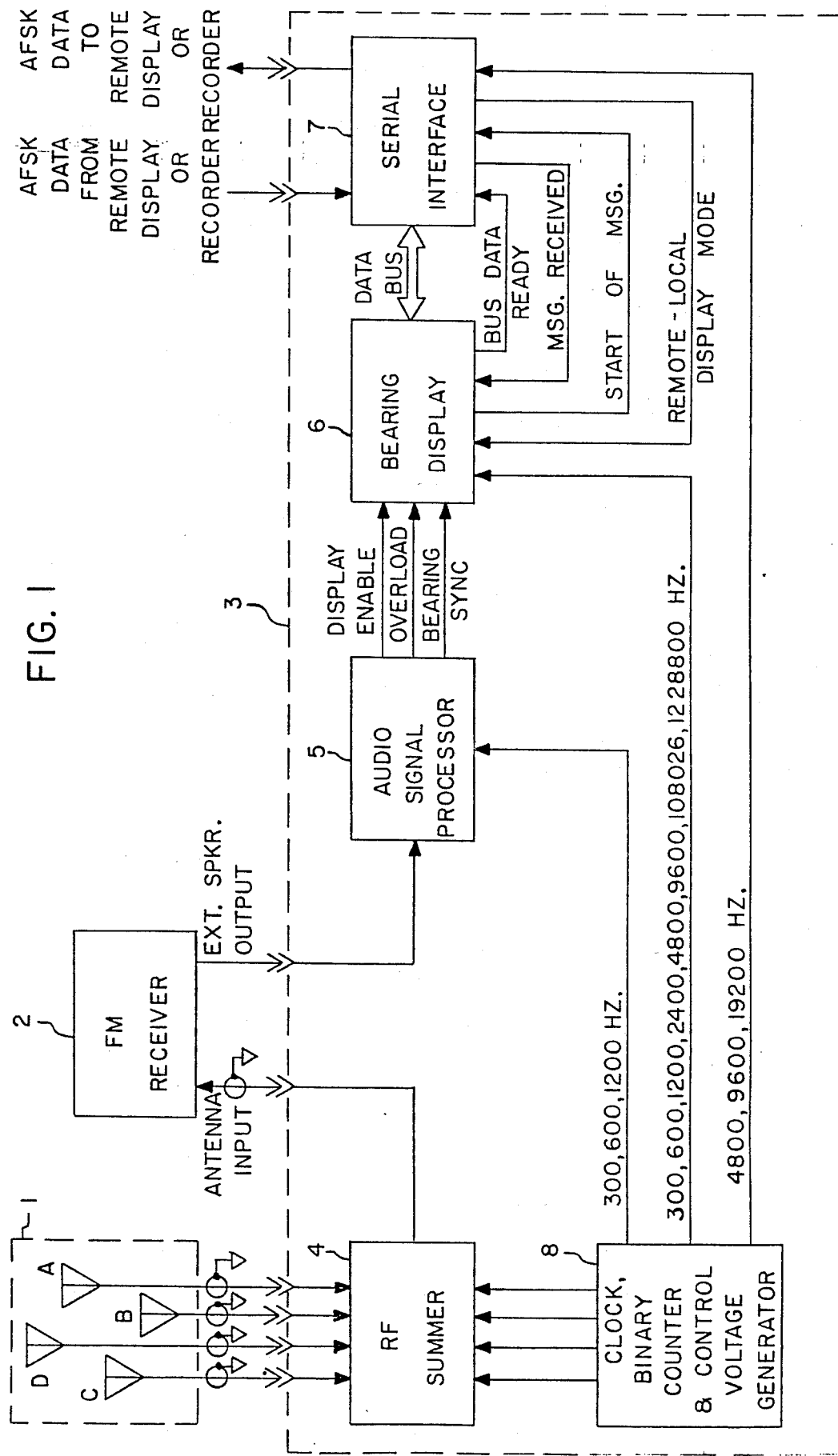
FIG. 1 is a block diagram of the overall direction finding system including a circular display of light emitting diodes (LEDs), a three digit decimal display and a serial interface for remote display.

The radio direction finding system is shown in FIG. 1 and consists of a four element antenna 1, a conventional FM receiver 2 and direction finding electronics 3. The electronics contain an rf summer 4 which combines the four antenna outputs into a single rf input to the receiver, an audio signal processor 5 which filters the receiver audio output and generates a sync signal related to the bearing angle, a bearing display 6 which computes and displays the bearing angle, and an optional serial interface 7 for remote transmission, reception, recording or playback of the bearing data. A clock, binary counter and control voltage generator 8 is also contained in the direction finding electronics which provides the control voltages to the rf summer and generates the various clock frequencies shown for timing and control.

Figure 2:
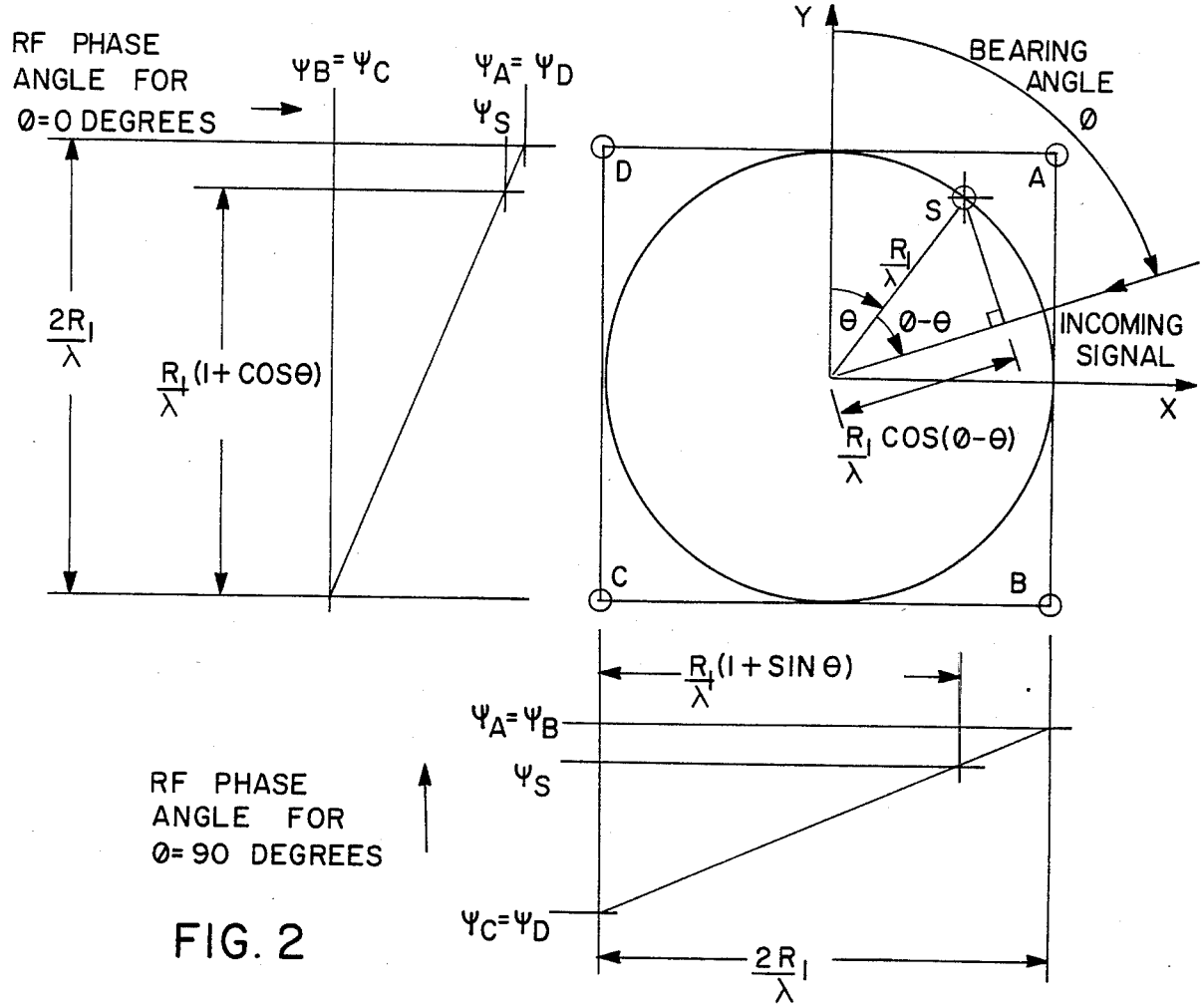
FIG. 2 shows the geometry for interpolating the phase in a four element antenna.

Control of the variable transconductance elements in the rf summer is based on a linear two dimensional interpolation of phase for the antenna geometry shown in FIG. 2. Antenna elements A, B, C and D are located in the four corners, or vertices, of a square having sides $2R_1/\lambda$. Coordinate axes and angles are oriented relative to the square array as shown in FIG. 2. If an incoming signal were arriving from a bearing angle of either 90 or 270 degrees, the phase at antennas A and B would be equal, and the phase at antennas C and D would also be equal. The phase at an imaginary point S, shown at radius $R_1/\lambda$ and angle $\theta$ can be computed from the linear interpolation between the two measured phases as indicated in the graph directly below the antenna in FIG. 2:

Phase at $S = \psi_S = \psi_{C\ or\ D} +$ $$\left[ \frac{(1 + \sin\theta)R_1/\lambda}{2R_1/\lambda} \right] (\psi_{A\ or\ B} - \psi_{C\ or\ D})$$

$$= K_X \psi_{A\ or\ B} + (1 - K_X)\psi_{C\ or\ D}$$

where $K_X = (1 + \sin\theta)/2$

For example, if S were midway between A and D, then $\theta = 0°$, $K_X = \frac{1}{2}$, $(1 - K_X) = \frac{1}{2}$, and the phase at S would be the simple average of the phases measured at A and D.

If an incoming signal arrived at a bearing of either 0 or 180 degrees, the phase at S would be computed from that at A or D and that at B or C by interpolating in the Y direction. Referring to the graph to the left of the antenna in FIG. 2:

$$\psi_S = \psi_{B\ or\ C} + \left[ \frac{(1 + \cos\theta)R_1/\lambda}{2R_1/\lambda} \right] (\psi_{A\ or\ D} - \psi_{B\ or\ C})$$

$$= K_Y \psi_{A\ or\ D} + (1 - K_Y)\psi_{B\ or\ C}$$

where $K_Y = (1 + \cos\theta)/2$

Extending these results to the general case where the bearing angle is arbitrary:

$$\psi_S = K_X K_Y \psi_A + K_X(1-K_Y)\psi_B + (1-K_X)(1-K_Y)\psi_C + (1-K_X)K_Y\psi_D$$

Direct application of this equation would require the simultaneous phase detection of all antenna outputs. As shown below, however, similar results are obtained when linear interpolation is applied directly to the rf voltages:

$$E_S = K_X K_Y E_A + K_X(1-K_Y)E_B + (1-K_X)(1-K_Y)E_C + (1-K_X)K_Y E_D$$

Figure 3:
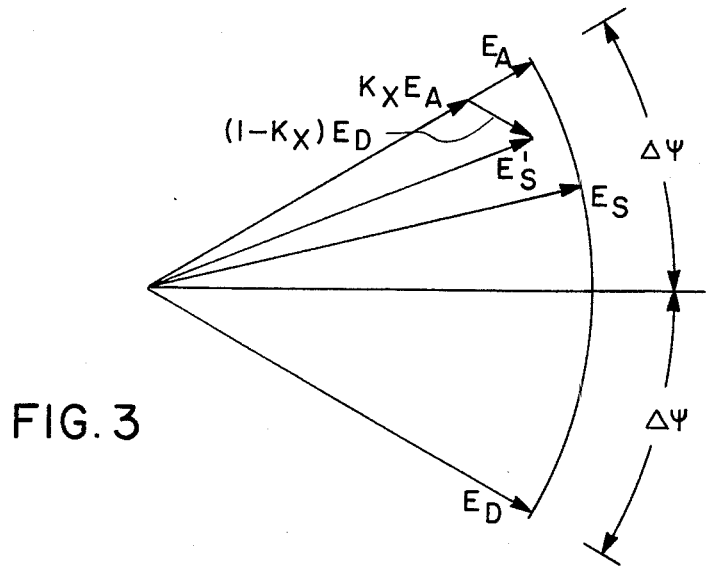
FIG. 3 illustrates the interpolation applied to two phasors representing the rf voltages induced in adjacent antenna elements.

The rf voltage induced in two adjacent antenna elements may be represented by two phasors of equal magnitude and angular separation $2\Delta\psi$. For example, if the bearing angle is $\Phi = 90$ degrees, the phasors shown in FIG. 3 represent the voltages induced in antennas A and D respectively. The phase angle $\Delta\psi$ is simply the antenna displacement relative to the center of the array expressed in degrees of the periodic rf waveform. The phase is leading at antenna A and lagging at antenna D. A linear interpolation applied to the rf voltages will result in the phasor $E_S'$ shown. While this phasor differs from the desired phasor $E_S$, it is clear that the error will be small if the antenna size and hence the angular separation $2\Delta\psi$ is small. On the other hand, the peak phase modulation is proportional to $\Delta\psi$ and should be large to permit separation of the phase modulation due to antenna commutation from transmitted modulation and noise components. Amplitude modulation is proportional to the difference in length of $E_S$ and $E_S'$. Analysis of the phasor diagram reveals that a good choice for the antenna size is the general range of $1/16 \leq 2R_1/\lambda \leq \frac{1}{4}$. This corresponds to a peak phase modulation of $11\frac{1}{4} \leq \Delta\psi \leq 45$ degrees and an amplitude modulation of $1.0 \leq M \leq 17.2$ percent.

For the above linear interpolation to most accurately simulate the voltage induced in an isolated antenna S rotating along the circular path shown in FIG. 2, the voltages appearing at the rf summer inputs should be equal to those induced in the individual antennas operating independently. The rf voltages and currents flowing in the system of four antennas shown in FIG. 2 with constant load impedance $R_L$ across each antenna are related by:

$$E_A - R_L I_1 = Z_S I_1 + Z_{MA} I_2 + Z_{MD} I_3 + Z_{MA} I_4$$

$$E_B - R_L I_2 = Z_{MA} I_1 + Z_S I_2 + Z_{MA} I_3 + Z_{MD} I_4$$

$$E_C - R_L I_3 = Z_{MD} I_1 + Z_{MA} I_2 + Z_S I_3 + Z_{MA} I_4$$

$$E_D - R_L I_4 = Z_{MA} I_1 + Z_{MD} I_2 + Z_{MA} I_3 + Z_S I_4$$

where $I_1$, $I_2$, $I_3$, $I_4$ are the currents flowing from antennas A, B, C, D respectively. $Z_S$ is the self-impedance of each antenna, $Z_{MA}$ is the mutual impedance between adjacent antennas, and $Z_{MD}$ is the mutual impedance between diagonally opposite antennas. $E_A$, $E_B$, $E_C$ and $E_D$ are the voltages induced in antenna elements A, B, C, and D by the incoming signal. Assuming the receiving antennas are located many wavelengths from the transmitter, these voltages will have equal amplitude and phase angles determined by the relative distance of each antenna toward the source:

$$\psi_A = 2\pi \sqrt{2} \; (R_1/\lambda) \cos(\phi - 45°)$$

$$\psi_B = 2\pi \sqrt{2} \; (R_1/\lambda) \cos(\phi - 135°)$$

$$\psi_C = 2\pi \sqrt{2} \; (R_1/\lambda) \cos(\phi - 225°)$$

$$\psi_D = 2\pi \sqrt{2} \; (R_1/\lambda) \cos(\phi - 315°)$$

Figure 4:
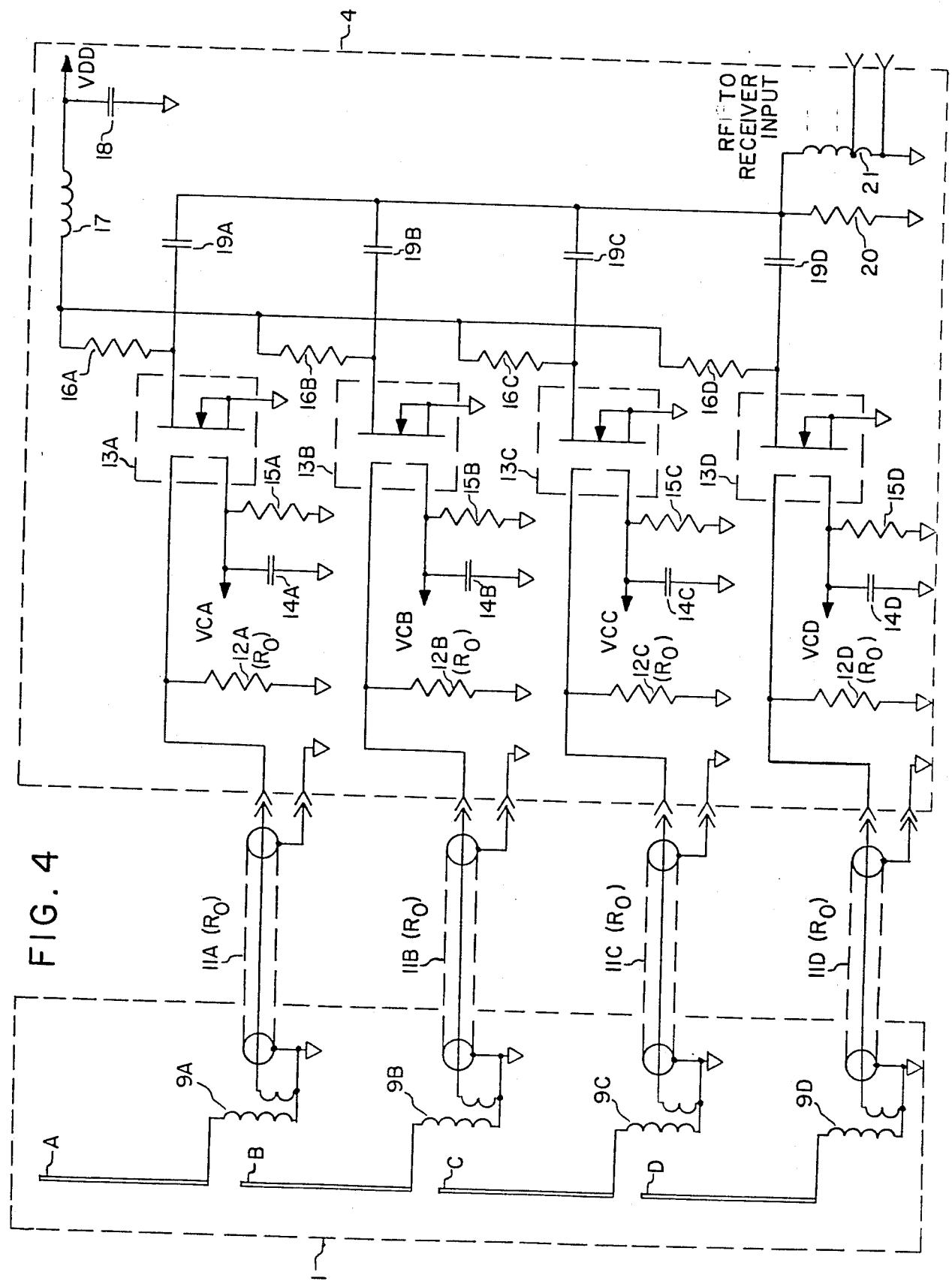
FIG. 4 is a schematic of the rf summer showing the connection to remote antenna elements through transmission lines matched to the rf summer input impedances.

Antenna impedances $Z_S$, $Z_{MA}$ and $Z_{MD}$ may be calculated using well known methods as, for example, that given in chapter 10 of *Antennas*, by John D. Kraus, McGraw-Hill, 1950. Solution of the above equations for the antenna currents and the rf summer output voltage shows that linear interpolation provides an output signal reasonably approximating that which would be induced in a continuously rotating antenna at S even if no attempt is made to reduce the coupling between antennas. If, however, the antenna currents are reduced by connecting antennas A, B, C, D to their transmission lines 11 through impedance transformers 9 as shown in FIG. 4, the voltages due to the antenna currents flowing through the self and mutual impedances will be small compared to the voltage drops across the increased equivalent load impedances. Under these conditions the antenna terminal voltages are very nearly equal to the isolated antenna voltages:

$$R_L I_1 \approx E_A, \; R_L I_2 \approx E_B, \; R_L I_3 \approx E_C, \; R_L I_4 \approx E_D$$

Therefore, the simple addition of an impedance transformation at the antenna end of the transmission line effectively eliminates the effect of mutual impedance interaction between the antennas although the net signal amplitude (and signal to noise ratio) is reduced. The characteristic impedance of the transmission line is matched to the rf summer input impedance 12 to prevent the occurrence of a standing wave on the transmission line and to permit the rf summer to be located remotely from the antenna.

Dual gate MOSFET transistors 13 operating in a common source configuration are used in the rf summer because the transconductance characteristic of this device provides a current source output proportional to the rf voltage input with the proportionality controlled by the low frequency voltage applied to the control gate, and because dual gate MOSFETs provide a constant input impedance. Capacitors 14 provide rf bypassing and smoothing of the control voltage inputs VCA, VCB, VCC and VCD. Resistors 15 prevent static voltage build-up on the control gates when the circuit is disconnected from its drive electronics. Resistors 16 determine the dc operating point of the MOSFETs and drain voltage is supplied through an RF choke 17 and a bypass capacitor 18. RF currents pass through capacitors 19 and are summed in the load comprising resistor 20 shunted by coil 21. The inductance of 21 is adjusted such that its reactance cancels the combined output capacitive reactance of the four MOSFETs. Receiver rf input is taken from the tap on coil 21.

Figure 5:
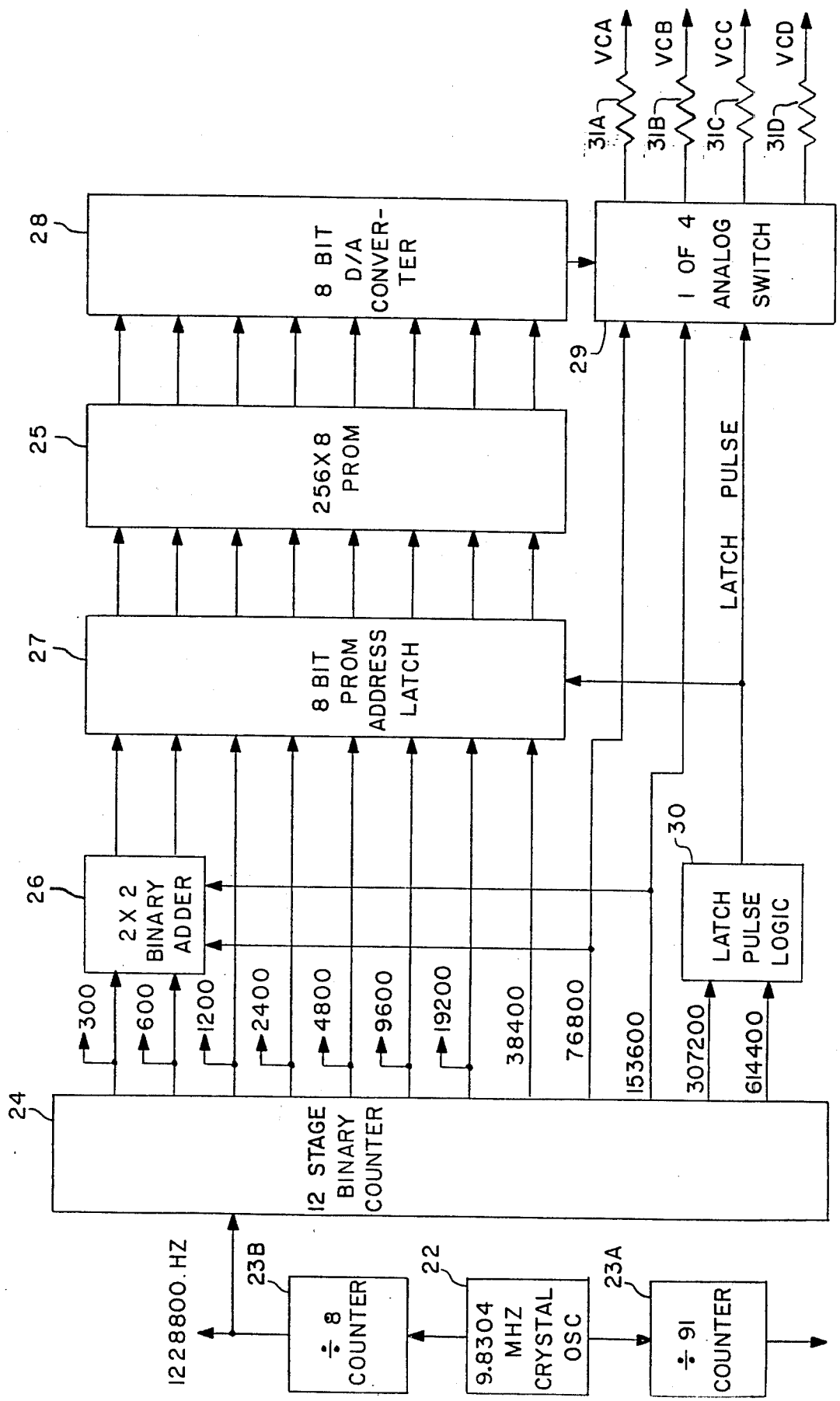
FIG. 5 is a block diagram of the clock, binary counter and rf summer control voltage generator circuits.

An average rf gain vs control gate voltage characteristic for the four MOSFET devices is combined with the desired interpolation gain as a function of commutation angle to obtain the required control voltage waveform. Since the gain of each rf summer channel is identical in waveform but shifted 90 degrees in phase, a multiplex system is used to generate the four control voltages from a single waveform storage element. FIG. 5 shows the circuitry used to generate system timing signals and the rf summer control voltages.

A single crystal controlled clock 22 of frequency 9.8304 MHz is used to generate all timing signals required to produce the rf summer control voltage waveforms, drive the LED circular display and the three digit decimal display, encode or decode display data in the serial interface, and generate the AFSK tones used for serial data transmission. A divide by 91 counter 23A generates 108,026 Hz which is used in the decimal display. A divide by 8 counter 23B generates 1,228,800 Hz which clocks the 12 stage binary ripple counter 24. This counter is used to produce an 8 bit incrementing address to the Programmable Read Only Memory (PROM) 25. When driven at a frequency of 1,228,800 Hz, the PROM address will cycle at a rate of 300 Hz, which is the commutation frequency of the system. To multiplex the PROM, the two most significant counter output bits are modified by adding a 0, 1, 2 and 3 sequentially using a binary full adder 26. The resulting count is held temporarily in an 8 bit address latch 27 which synchronizes the otherwise skewed outputs of the ripple counter. PROM 25 provides an 8 bit address by 8 bit output memory for the control voltage waveform. Each address corresponds to 360/256 or 1.40625 degrees of commutation, while the output is scaled to cover the required range of the rf summer control voltage with a resolution of 1/256 or 0.4 percent. The PROM output is converted to an analog voltage by digital to analog (D/A) converter 28 which is then de-multiplexed into the four control voltages by analog switch 29. The analog switch channel selection is controlled by the same clock frequencies used to multiplex the PROM address, and a logic pulse is decoded from the two highest frequency outputs of counter 24 by logic gates 30 to inhibit the switch 29 except during that portion of the cycle when the converter output is stable. The same latch pulse provides the synchronizing pulse to the address latch 27. Analog outputs from switch 29 are applied to MOSFET gate capacitors 14 through resistors 31. The resulting R-C filter holds the control voltage between samples and smoothes the transitions between the small steps in the waveform.

Figure 6:
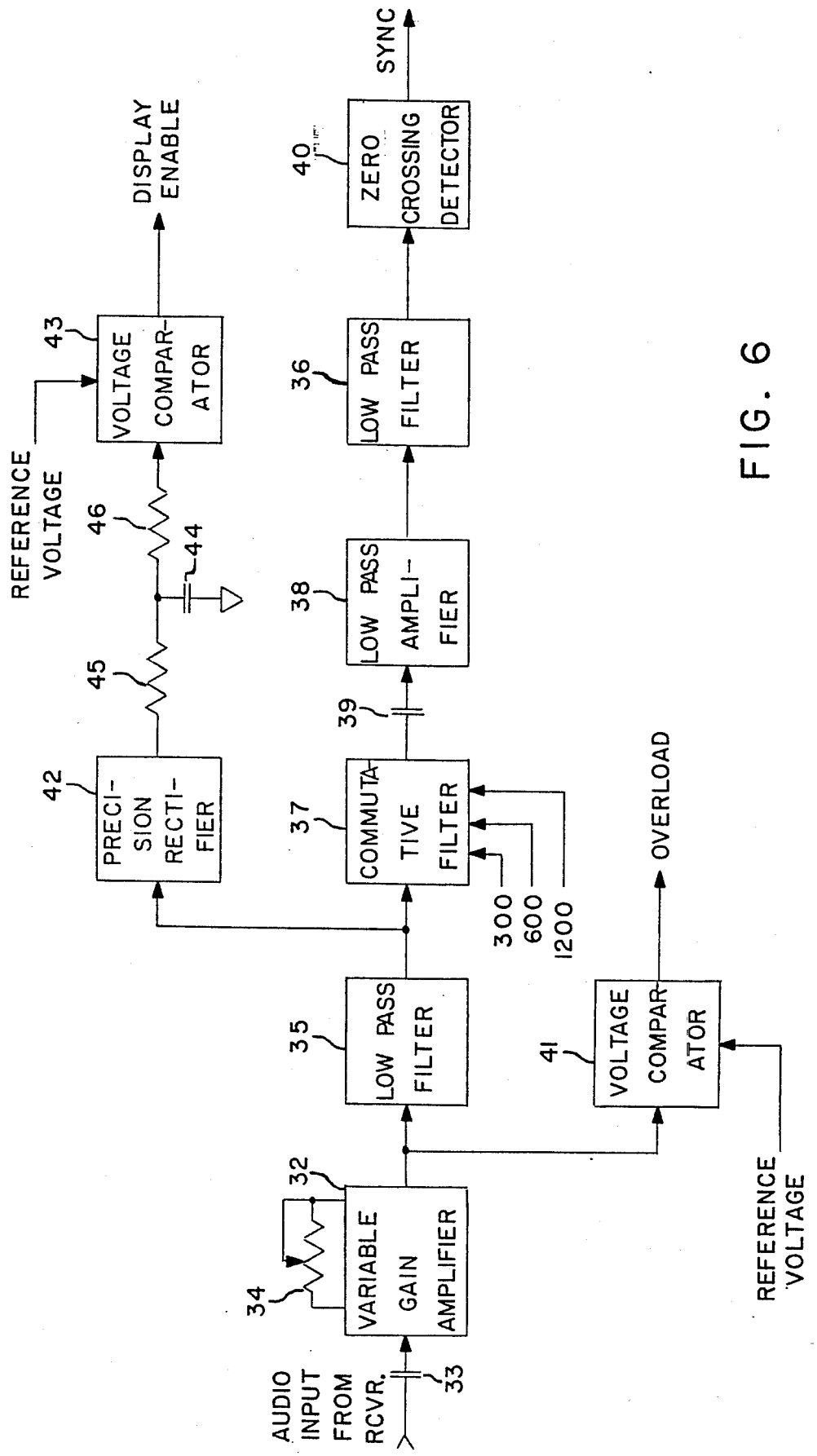
FIG. 6 is a block diagram of the audio signal processor circuit.

FIG. 6 shows the circuitry used to extract the 300 Hz commutation frequency from the reciever's audio output and provide a logic signal synchronized to the phase of the commutation frequency for the bearing display. Threshold detectors are also provided to give an overload indication to assist in setting up the audio gain of the circuit and to blank the display when no signal is present.

Amplifier 32 is ac coupled to the receiver by capacitor 33 and contains a variable resistance gain 34 which is adjusted to match the receiver's audio output level.

Low pass filters 35 and 36 are identical second order low pass filters tuned to a frequency of 469 Hz with critical damping. These filters and the commutative filter 37 were designed using the procedure given in "Get Notch Qs in the Hundreds" by Mike Kaufman, Electronic Design 16, 8/2/74, pp. 86–101.

The eight section commutative filter 37 provides a 300 Hz bandpass synchronized to the antenna commutation frequency. Since the Q of the commutative filter determines the speed of response of the system as well as the selectivity, a tradeoff can be made in its selection. A value of 425 provides a good compromise, but individual usage may dictate a somewhat faster or slower responding display.

Low pass amplifier 38 provides additional gain and helps to attenuate harmonics produced in the commutative filter. Ac coupling is provided by capacitor 39 and is used because the commutative filter passes dc. The filtered 300 Hz signal is applied to zero crossing detector 40 to produce a square wave sync signal for the display circuit.

A voltage comparator 41 generates an overload signal when the audio input exceeds a reference voltage. This is helpful in setting the audio gain of the system. Blanking of the display in the absence of audio input (when the receiver is squelched) is accomplished by rectifying the filtered audio signal in precision rectifier 42 and comparing its value to a reference voltage in comparator 43. A blanking delay of approximately 100 milliseconds is provided by capacitor 44 and resistors 45 and 46.

Figure 7:
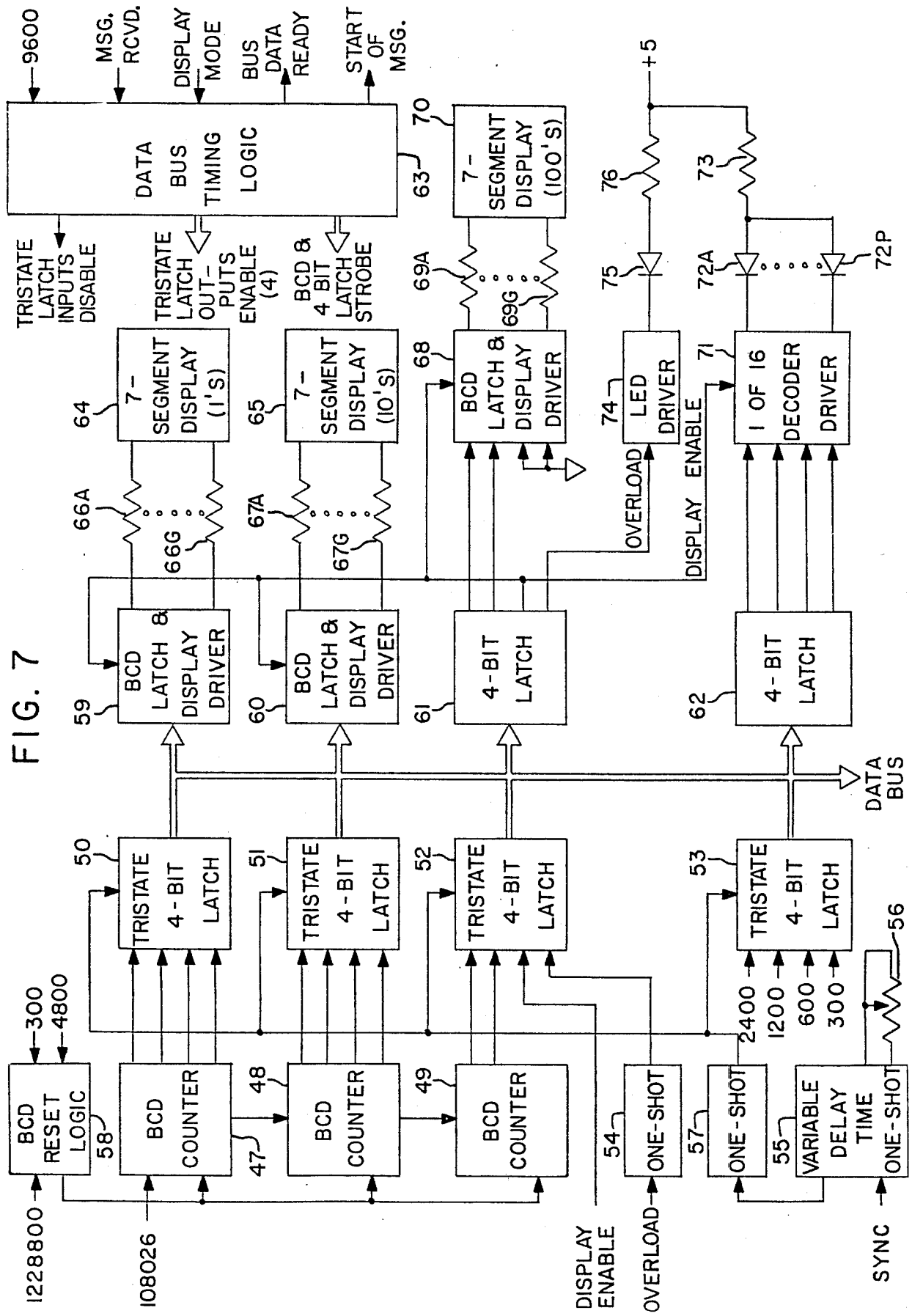
FIG. 7 is a block diagram of the bearing display circuits.

FIG. 7 is a block diagram of the circuitry used to provide a circular bearing display consisting of 16 light emitting diodes (LEDs) and a three digit decimal bearing readout calibrated directly in degrees. This circuit is designed for use with the serial interface described below and uses a 4 bit data bus to transfer data between temporary holding registers and the display latches.

BCD counter latches 47, 48 and 49 are driven by the 108,026 Hz clock frequency, and their contents are latched into the tri-state latches 50, 51 and 52 by the delayed sync pulse. The binary clock count from counter 24 is simultaneously strobed into latch 53 by the same delayed sync pulse. The maximum degree count is 359, so the maximum BCD number required for the hundreds digit is 3 (binary 0011). Since the two most significant bits of this digit are constant, they are used to transfer the overload and the display enable information. One-shot 54 is used to stabilize the overload flag for sampling.

Two simple one-shots are used to convert the square wave sync signal from 40 into a short positive clock pulse which is used to latch the binary and BCD clock counts into the quad latches. The first one-shot 55 has a delay time adjustable by resistor 56 to permit calibration of the display over a 90 degree bearing angle. The second one-shot 57 generates a 10 microsecond latching pulse.

Selection of the system clock frequency and dividers was made so as to produce compatible binary and BCD counter frequencies. Over a complete commutation interval of 1/300th second, the 4 bit binary input to register 53 will increment through $(2400/300) \times 2 = 16$ counts. Each of these counts then corresponds to 1/16th of a revolution on the LED circular display. Over the same time interval, the clock input to the BCD counters generates $108,026/300 = 360.09$ counts, or approximately one count per degree. Although the error is very small (less than 0.1 degree), it will accumulate rapidly unless it is periodically synchronized back to the binary counter. Digital logic 58 generates a short pulse every 1/300th second to reset the three BCD counters every complete cycle (as defined by the binary counters) such that the BCD and binary counts remain synchronized.

At a rate of 2.34375 times per second (each 0.42666 seconds) data is transferred from tri-state registers 50–53 to latching registers 59–62. Timing for the data transfer is obtained from the bus timing logic 63, and the sequence is as follows for the case where local data is to be displayed. At the beginning of each data bus transfer cycle, the inputs to registers 50–53 are disabled. These inputs remain disabled during the first quarter of the transfer cycle (106.66 milliseconds). During this same quarter cycle, the tri-state outputs of these registers are placed sequentially on to the bus. The order of selection is 52 (overload-blanking-hundreds), 51 (tens), 50 (units) and 53 (binary). Each register is connected to the bus for 26.66 milliseconds. While a tri-state register is connected to the bus, a corresponding display register 59–62 is strobed. The data transferred to the display registers is held until the next update (426.66 milliseconds later). Consequently, the display appears stable, but is still reasonably responsive to changes in the bearing data. Also, the data displayed is consistent, i.e., the binary and BCD data displayed are sampled simultaneously even though they are transferred sequentially.

Registers 59 and 60 are BCD to seven segment latching drivers which drive the units display 64 and tens display 65 directly through current limiting resistors 66–67. Latch 61 is a holding register which provides the two bits of hundreds data to the seven segment driver 68, current limiting resistors 69 and display 70. The display enable information and overload data are also available from outputs of latch 61. Display enable is applied to drivers 59, 60, 68 and 71. Quad latch 62 holds the binary LED display data for the 1 of 16 decoder/driver 71. LEDs 72A–72P share a common anode resistor 73, and their cathodes are connected to ground by the decoder/driver. The overload signal is applied to driver 74 which controls LED 75 through current limiting resistor 76.

Figure 8:
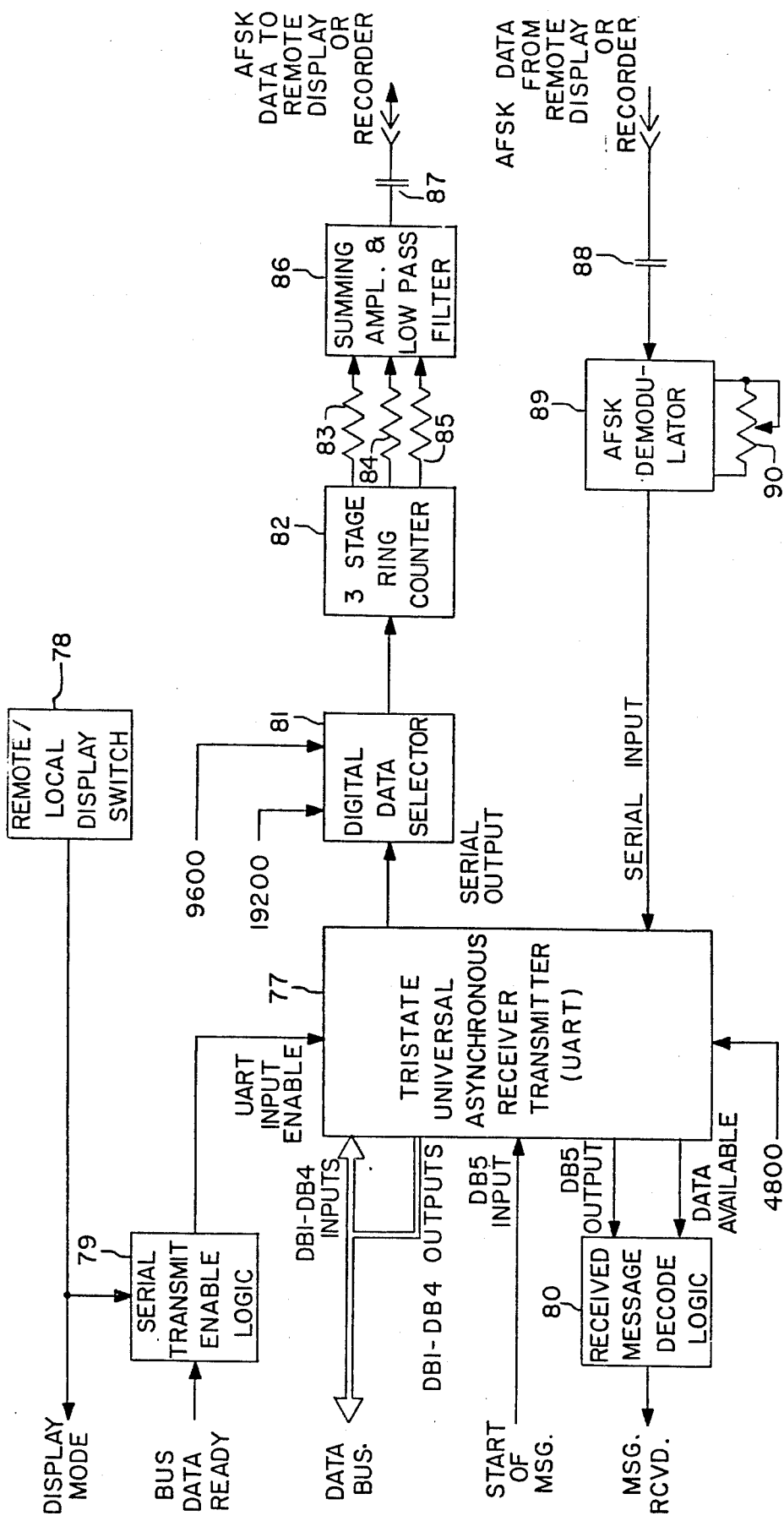
FIG. 8 is a block diamgram of the serial interface circuitry.

The serial interface is shown in FIG. 8 which permits remote transmission or reception of the displayed data using standard 300 Baud audio frequency shift keyed (AFSK) tones. This data rate and the AFSK tones used are also compatible with data recording and playback using a conventional audio tape recorder.

The Universal Asynchronous Receiver Transmitter (UART) 77 is programmed for five data bits, no parity and 1½ stop bits per character. The first four data bits of each character are simply the four data bus bits transferred to the display registers 59–62 in FIG. 7. The fifth data bit is used to signal the first word of the four word message; a zero represents the first word (overload-blanking-hundreds).

When locally received data is to be displayed, the UART operates in its transmit mode. The data transfer across the data bus operates as explained above, and the data bus is clocked into the UART transmit buffer whenever any of the display registers is strobed. The UART input enable pulse is formed by gating the output of the remote/local display mode switch 78 with the bus data ready pulse in logic 79. Thus, a four word packet of data is sent every 426.666 milliseconds. At 300 Baud, it requires (5+1½)/300 seconds or 21.666 milliseconds to send each data word. Since data is taken from the bus each 26.666 milliseconds, this creates a gap of 5 milliseconds between consecutive words.

When display of remote data is selected, the timing signals generated by 63 change somewhat. Tri-state registers 50-53 are disconnected from the data bus, and the UART tri-state received data output is connected to the bus. When a first word has been received (bit 5=0 and UART data available), a message received pulse is generated by 80 which resets the timing logic 63. Data transfer into the display registers then proceeds as described above except the UART supplies the data. The first data word is clocked into display register 61 at 13.333 milliseconds following data reception. Therefore, a large skew can be tolerated between local and remote data clocks without affecting system operation.

In "Display Local" mode, data at 300 Baud from the UART serial output is used to select in 81 which of two clock frequencies, 9600 or 19,200 Hz, is applied to the three stage ring counter 82. The counter outputs are applied through summing resistors 83-85 to amplifier 86. The weighting of the three summing resistors is chosen such that the filtered output of 86 approximates a sine wave of frequency 1200 Hz when the UART ouput is "0" or 2400 Hz when the UART output is a "1". Sinewave distortion is below 5% with this technique, and the AFSK frequencies are as accurate as the system clock. AFSK output is provided through coupling capacitor 87 for tape recording or transmission to a remote bearing display.

In "Display Remote" mode, AFSK input is ac coupled through 88 to demodulator 89 which is tuned for 300 Baud, 1200/2400 Hz operation. Variable resistor 90 provides the fine tuning adjustment required to center the demodulator frequency discriminator between the 1200 and 2400 Hz AFSK frequencies.

While the above description contains many specificities, these should not be construed as limitations on the scope of the invention, but rather as an exemplification of one preferred embodiment thereof. Many other variations are possible. For example, impedance transformers 9 may be omitted with some loss of performance, but a reduction in antenna cost and complexity. Also, the serial interface given in FIG. 8 may be omitted in its entirety without affecting the operation of the rest of the system. Similarly, the decimal readout may be eliminated resulting again in a large savings in cost and complexity. If only the circular LED display is desired, the data bus system shown on FIG. 7 may be bypassed by directly connecting elements 53 to 71, 41 to 74 and 43 to 71.

Finally, it is apparent from the derivation given for the rf summer gains required to provide linear two dimensional interpolation of four antennas located at the corners of a square array that a similar derivation can be made for any number of antennas sufficient to define a polygonal figure provided that the maximum distance between all adjacent elements is less than one half wavelength. In particular, triangular and general rectangular antenna arrays are variations of this invention.

The embodiments of the invention in which a particular property or privilege is claimed are defined as follows:

1. A radio direction finding system for determining the bearing of a source of an rf signal comprising:
    an array of "n" nondirectional antennas substantially located at the vertices of a regular polygon of "n" sides and positioned substantially perpendicular to the plane of the polygon, where "n" is an integer having values in the range of from 3 to 8, the length of each side of the polygon being in the range of from one eighth to three eighths the wavelength of the rf signals of the source;
    "n" electronically controlled variable gain means, the gain of each of which is a continuous function of a control signal applied thereto, each such variable gain means having a substantially constant input impedance and producing an output signal which is a function of an input signal applied thereto and the control signal;
    "n" transmission line means each connecting an antenna to a variable gain means for applying antenna signals induced in the antenna to which each transmission line is connected to one of said variable gain means as the input signal thereto, each transmission line presenting to the antenna to which it is connected a characteristic impedance substantially matched to the input impedance of the variable gain means to which it applied signals;
    circuit means for summing the output signals of each of the variable gain means to produce a summed output signal;
    control signal means for producing "n" control signals for varying the gains of the variable gain means so that the summed output signal approximates the signals induced in a single antenna rotating in a circular path at a rotational frequency corresponding to a doppler modulation frequency f(d) in the audio range;
    circuit means for applying a control signal produced by the control signal means to each of the variable gain means;
    receiver means to which the summed output signal is applied for detecting the doppler modulation frequency of the summed output signal;
    means for measuring the phase angle of the doppler modulation frequency with respect to one of the control signals for generating a bearing signal which is a function of said phase angle; and
    means for displaying the bearing signal.

2. In a radio direction finding system as defined in claim 1, in which the control signals are phased at 360°/n intervals and the length of each of the polygon sides is substantially one-fourth the wave length of the rf signals of the source.

3. A radio direction finding system as defined in claim 2, in which "n" equals four.

4. A radio direction finding system as defined in claim 3, in which each of the variable gain means includes a variable transconductance device.

5. A radio direction finding system as defined in claim 4, in which the variable transconductance device is a dual gate MOSFET transistor in common source configuration with one of the control signals being applied to the control gate thereof.

6. A radio direction finding system as defined in claim 5, in which the circuit means for summing the output signal of each of the variable gain means is a common load impedance.

7. A radio direction finding system as defined in claim 6, in which the control signal means includes addressable memory means for storing digitized signals defining a wave form for each control signal, counter means for producing addresses of the memory means for reading out of the memory means digitized signals spaced at one-fourth the full address range of the memory locations of the memory means storing said digitized signals, and four d/a converters to which the digitized signals read out of the memory means are applied for producing the four control signals.

8. A radio direction finding system as defined in claim 1, in which the receiver means is a conventional FM receiver.

9. A radio direction finding system as defined in claim 8, in which the doppler modulation frequency f(d) is substantially 300 Hz.

10. A radio direction system for determining the bearing of a source of an rf signal comprising:
  an array of four nondirectional antennas substantially located at the corners of a square, the sides of the square having a length substantially equal to one-quarter of the wavelength of the radio frequency signals of the source;
  four electronically controlled variable gain means, the gain of each of which is a continuous function of a control voltage applied thereto, each such variable gain means having a substantially constant input impedance and producing an output current which is a function of an input voltage and the control voltage applied thereto;
  four rf transmission lines, each transmission line applying an input voltage from currents induced in each of the antennas by signals from the source to one of said variable gain means, each transmission line presenting to the antenna to which it is connected a characteristic impedance substantially matched to the input impedance of the variable gain means to which it is connected;
  circuit means for summing the output currents of each of the variable gain means to produce a summed output signal;
  control voltage generating means for producing four control voltages for varying the gains of the variable gain means so that the summed output signal approximates that produced by a single antenna moving in a circular path inscribing the antenna array at an angular velocity corresponding to a doppler modulation frequency f(d) which is in the audio range;
  circuit means for applying the control voltages produced by the control voltage generating means to the variable gain means;
  FM receiver means to which the summed output signal is applied for detecting the doppler modulation of the summed output signal;
  means for measuring the phase angle of the doppler modulation of the summed output signal with respect to one of the control voltages for generating a bearing signal which is a function of the phase angle; and
  means for displaying the bearing signal.

11. A radio direction finding system as defined in claim 10, in which each of the variable gain means includes a variable transconductance device that produces an output current which is proportional to the input voltage and the control voltage.

12. A radio direction finding system as defined in claim 11, in which the variable transconductance device is a dual gate MOSFET transistor in common source configuration with one of the control signals being applied to the control gate thereof.

13. A radio direction finding system as defined in claim 12, in which the control voltages are phased at 90° intervals.

14. A radio direction finding system as defined in claim 13, in which f(d) is substantially 300 Hz.

15. A radio direction finding system as defined in claim 14, in which the control voltage generator means includes an addressable memory means for storing digitized signals defining a wave form for each control signal, counter means for producing addresses of the memory means for reading out of the memory digitized signals spaced at one-fourth the full address range of the memory locations of the memory means in which the digitized signals are stored and four d/a converters to which the digitized signals read out of the memory means are applied for producing said four control signals.

* * * * *